US012205423B2

(12) United States Patent
Niegmann

(10) Patent No.: US 12,205,423 B2
(45) Date of Patent: Jan. 21, 2025

(54) SYSTEM, LOCK DEVICE AND KEY DEVICE BASED ON MAGNET AND MAGNETICALLY CONTROLLABLE SWITCH

(71) Applicant: ASSA ABLOY AB, Stockholm (SE)

(72) Inventor: Kaj Niegmann, Hägersten (SE)

(73) Assignee: ASSA ABLOY AB, Stockholm (SE)

( * ) Notice: Subject to any disclaimer, the term of this patent is extended or adjusted under 35 U.S.C. 154(b) by 38 days.

(21) Appl. No.: 18/022,951

(22) PCT Filed: Aug. 25, 2021

(86) PCT No.: PCT/EP2021/073506
§ 371 (c)(1),
(2) Date: Feb. 23, 2023

(87) PCT Pub. No.: WO2022/043375
PCT Pub. Date: Mar. 3, 2022

(65) Prior Publication Data
US 2023/0316833 A1 Oct. 5, 2023

(30) Foreign Application Priority Data
Aug. 26, 2020 (SE) .................................... 2030270-9

(51) Int. Cl.
*G07C 9/00* (2020.01)

(52) U.S. Cl.
CPC .................... *G07C 9/00309* (2013.01); *G07C 2009/00373* (2013.01); *G07C 2009/00634* (2013.01);
(Continued)

(58) Field of Classification Search
None
See application file for complete search history.

(56) References Cited

U.S. PATENT DOCUMENTS 4,798,068 A 1/1989 Kakauchi
5,764,185 A * 6/1998 Fukushima .............. H01Q 3/04
342/359
(Continued)

FOREIGN PATENT DOCUMENTS

AU 2009225381 A1 * 5/2010 ......... A61N 1/37264
CA 2206286 11/1998
(Continued)

OTHER PUBLICATIONS

Official Action for Sweden Patent Application No. 2030270-9, dated Mar. 17, 2021, 7 pages.
(Continued)

*Primary Examiner* — Fekadeselassie Girma
(74) *Attorney, Agent, or Firm* — Schwegman Lundberg & Woessner, P.A.

(57) ABSTRACT

It is provided a system comprising a lock device and a key device for use in access control to a physical space. The key device comprises: an electronic key module configured to communicate with an electronic lock module of the lock device for access control; and a permanent magnet configured to close a magnetically controllable switch of the lock device to thereby power an electronic lock module of the lock device. The lock device comprises: the electronic lock module configured to communicate with the electronic key module to evaluate whether to grant access; a power source; and the magnetically controllable switch provided between the power source and the electronic lock module such that the magnetically controllable switch is closable by the permanent magnet of the key device to power the electronic lock module.

16 Claims, 1 Drawing Sheet

(52) U.S. Cl.
CPC .............. *G07C 2009/00769* (2013.01); *G07C 2009/00984* (2013.01)

(56) References Cited

U.S. PATENT DOCUMENTS

| | | | | |
|---|---|---|---|---|
| 5,826,450 | A | 10/1998 | Lerchner et al. | |
| 6,657,537 | B1 | 12/2003 | Hauler | |
| 7,472,409 | B1 * | 12/2008 | Linton | H01Q 3/08 343/705 |
| 9,963,921 | B1 * | 5/2018 | Kamkar | G07C 9/00174 |
| 11,272,279 | B1 * | 3/2022 | Bloom | H04R 1/1066 |
| 2004/0040355 | A1 * | 3/2004 | Goldman | E05B 47/0615 70/277 |
| 2004/0055346 | A1 * | 3/2004 | Gillert | H01F 7/1646 70/276 |
| 2005/0219036 | A1 * | 10/2005 | Ueda | B60R 25/2036 340/5.72 |
| 2006/0060708 | A1 * | 3/2006 | Decker | B64D 35/00 244/129.1 |
| 2016/0257286 | A1 | 9/2016 | Bianchi et al. | |
| 2017/0167166 | A1 * | 6/2017 | Perreau | E05B 73/0029 |
| 2019/0044573 | A1 * | 2/2019 | Schantz | H04B 1/7163 |
| 2020/0051351 | A1 * | 2/2020 | Shin | H04W 4/023 |
| 2020/0190859 | A1 * | 6/2020 | Green | E05B 47/0623 |
| 2020/0360692 | A1 * | 11/2020 | Azar | A61N 1/0408 |
| 2021/0062546 | A1 * | 3/2021 | Robertson | G07C 9/0073 |
| 2021/0123934 | A1 * | 4/2021 | Benedetti | G16H 50/20 |
| 2021/0207399 | A1 * | 7/2021 | Piirainen | H01F 7/0221 |
| 2022/0068060 | A1 * | 3/2022 | Li | G08B 21/24 |
| 2022/0341217 | A1 * | 10/2022 | Cristache | G06Q 30/01 |
| 2024/0167236 | A1 * | 5/2024 | Cristache | H04W 12/08 |

FOREIGN PATENT DOCUMENTS

| | | | | |
|---|---|---|---|---|
| CA | 2206286 | A1 * | 11/1998 | |
| DE | 2724025 | | 12/1977 | |
| DE | 20102047 | | 5/2001 | |
| DE | 10006747 | | 8/2001 | |
| EP | 0818596 | | 1/1998 | |
| EP | 1378620 | A2 * | 1/2004 | E05B 47/0615 |
| EP | 1662078 | | 5/2006 | |
| EP | 1662078 | B1 * | 12/2014 | G06Q 20/206 |
| EP | 2933782 | | 10/2015 | |
| KR | 200382646 | | 4/2005 | |
| KR | 20170044912 | A * | 4/2017 | |
| WO | WO 93/18257 | | 9/1993 | |
| WO | WO-2019023582 | A1 * | 1/2019 | B65D 39/0052 |

OTHER PUBLICATIONS

Official Action for Sweden Patent Application No. 2030270-9, dated Mar. 17, 2022, 4 pages.

Official Action for Sweden Patent Application No. 2030270-9, dated Aug. 19, 2022, 16 pages.

International Search Report and Written Opinion for International (PCT) Patent Application No. PCT/EP2021/073506, dated Dec. 10, 2021, 14 pages.

Written Opinion of the International Preliminary Examining Authority for International (PCT) Patent Application No. PCT/EP2021/073506, dated Jul. 26, 2022, 6 pages.

International Preliminary Report on Patentability for International (PCT) Patent Application No. PCT/EP2021/073506, dated Dec. 6, 2022, 23 pages.

* cited by examiner

SYSTEM, LOCK DEVICE AND KEY DEVICE BASED ON MAGNET AND MAGNETICALLY CONTROLLABLE SWITCH

CROSS REFERENCE TO RELATED APPLICATIONS

This application is a national stage application under 35 U.S.C. 371 and claims the benefit of PCT Application No. PCT/EP2021/073506 having an international filing date of Aug. 25, 2021, which designated the United States, which PCT application claimed the benefit of Sweden Patent Application No. 2030270-9 filed Aug. 26, 2020, the disclosure of each of which are incorporated herein by reference.

TECHNICAL FIELD

The present disclosure relates to the field of access control for a physical space and in particular to a system, a lock device and a key device based on magnet in the key device and a magnetically controllable switch in the lock device.

BACKGROUND

Locks and keys are evolving from the traditional pure mechanical locks. These days, electronic locks are becoming increasingly common. For lock devices based on electronic locks, no mechanical key profile is needed for authentication of a user. The lock devices can e.g. be opened using a key device comprising an electronic key. Electronic key data can be stored on a carrier (fob, card, hybrid physical-electronic key, etc.). The key device and lock device can e.g. communicate over a wireless interface. Such electronic solutions provide a number of benefits, including improved flexibility in management of access rights, audit trails, deactivation of lost or stolen keys, etc.

The lock device can be powered using wired (mains or DC (Direct current)) power or a self-contained power source, such as a battery. Especially when the lock is powered by a self-contained power source, power consumption should be kept very low, since any increase in power consumption leads to the self-contained power source being depleted faster. This results in more frequent need for battery replacement, etc.

When the communication between the lock device and the key device is based on wireless communication, the lock device needs to ping to detect when the key device is present. Such pinging consumes a lot of power and it would be of great benefit if the pinging can be avoided.

SUMMARY

One object is to reduce power consumption in a lock device based on wireless communication with a key device.

According to a first aspect, it is provided a system comprising a lock device and a key device for use in access control to a physical space. The key device comprises: an electronic key module configured to communicate with an electronic lock module of the lock device for access control; and a permanent magnet configured to close a magnetically controllable switch of the lock device to thereby power an electronic lock module of the lock device. The lock device comprises: the electronic lock module configured to communicate with the electronic key module to evaluate whether to grant access; a power source; and the magnetically controllable switch provided between the power source and the electronic lock module such that the magnetically controllable switch is closable by the permanent magnet of the key device to power the electronic lock module.

The magnetically controllable switch may be open unless a sufficiently strong magnetic field causes the magnetically controllable switch to close.

The lock device further comprises a magnetic-metal plate provided in a position to direct the key device to align a key antenna of the key device with a lock antenna of the lock device.

The lock device may be configured such that the electronic lock module is only powered when the magnetically controllable switch is closed.

The lock device may be configured such that the closure of the magnetically controllable switch functions as a wake-up signal for the electronic lock module.

The electronic key module and the electronic lock module may be configured to communicate using a wireless communication protocol.

The magnetically controllable switch may be a reed switch.

According to a second aspect, it is provided a lock device for use in access control to a physical space, the lock device comprises: an electronic lock module configured to communicate with an electronic key module of a key device to evaluate whether to grant access; a power source; and a magnetically controllable switch provided between the power source and the electronic lock module such that the magnetically controllable switch is closable by the permanent magnet of the key device.

The magnetically controllable switch may be open unless a sufficiently strong magnetic field causes the magnetically controllable switch to close.

The lock device according may further comprise a magnetic-metal plate provided in a position to direct the key device to align a key antenna of the key device with a lock antenna of the lock device.

The lock device may be configured such that the electronic lock module is only powered when the magnetically controllable switch is closed.

The lock device may be configured such that the closure of the magnetically controllable switch functions as a wake-up signal for the electronic lock module.

The electronic lock module may be configured to communicate with the electronic key module using a wireless communication protocol.

The magnetically controllable switch may be a reed switch.

According to a third aspect, it is provided a key device for use in access control to a physical space. The key device comprises: an electronic key module configured to interact with an electronic lock module of a lock device for access control; and a permanent magnet configured to close a magnetically controllable switch of the lock device to thereby power the lock device.

The key device may comprise only one permanent magnet.

The electronic key module may be configured to communicate with the electronic lock module using a wireless communication protocol.

The key device may be in the form of a key fob.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
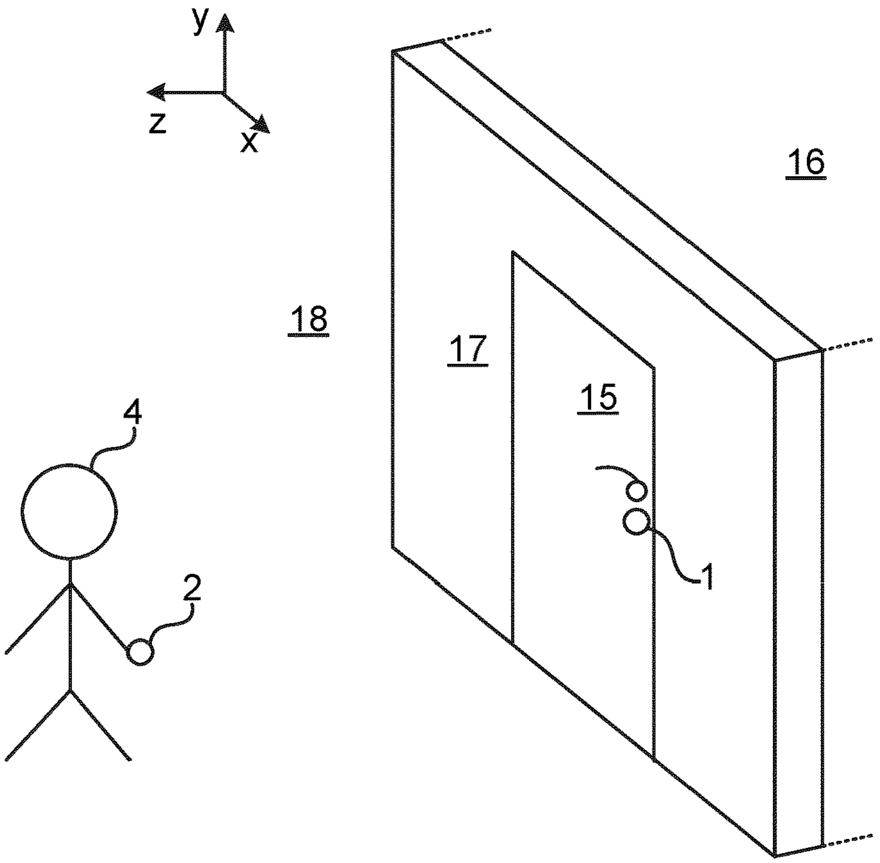
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable. The physical barrier 15 stands between the restricted physical space 16 and an accessible physical space 18. Note that the accessible physical space 18 can be a restricted physical space in itself, but in relation to this physical barrier 15, the accessible physical space 18 is accessible. The barrier 15 can be a door, gate, hatch, cabinet door, drawer, window, etc. In order to control access to the physical space 16, by selectively unlocking the barrier 15, a lock device 1 is provided.

The lock device 1 can be provided in the barrier 15 (as shown) or in a structure 17 surrounding the barrier 15 (not shown). The lock device 1 comprises an electronic lock module to control when the lock device is to be in a locked state or in an unlocked state.

The lock device 1 communicates with a key device 2 of a user 4 to evaluate whether access should be granted or not to the restricted physical space 16. As explained in more detail below, the access control in the lock device 1 is activated when a magnet of the key device 2 causes a magnetically controllable switch in the lock device 1 to power the electronic lock module in the lock device 1.

When the lock device 1 is in an unlocked state, the barrier 15 can be opened and when the lock device 1 is in a locked state, the barrier 15 cannot be opened. In this way, access to a restricted physical space 16 is controlled by the lock device 1.

Figure 2:
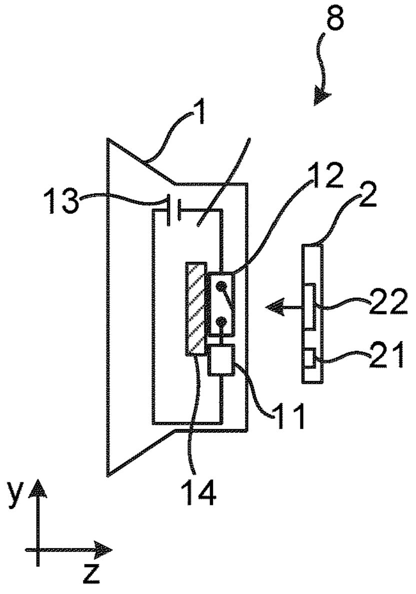
FIG. 2 is a schematic diagram illustrating a system comprising the key device and lock device of FIG. 1 according to one embodiment.

FIG. 2 is a schematic diagram illustrating a system 8 comprising the key device 2 and lock device 1 of FIG. 1 according to one embodiment.

The key device 2 comprises an electronic key module 21 and a permanent magnet 22. The permanent magnet can be of any suitable type. The electronic key module 21 comprises suitable hardware and/or software to interact with an electronic lock module 11 of the lock device 1. For instance, the electronic key module 21 can store or have access to electronic key data of the electronic key which is used by the lock device for performing authentication and authorisation.

The lock device 1 comprises the electronic lock module 11, a power source 13 and a magnetically controllable switch 12 provided between the power source 13 and the electronic lock module 11. The electronic key module 21 comprises suitable hardware and/or software to interact with the electronic key module 21 of the key device 2, to authenticate the electronic key module 21. Once authenticated, the lock device checks authorisation of the electronic key 2, i.e. whether is it has access rights to unlock the lock device. The electronic key module 21 and the electronic lock module 11 can be configured to communicate using any suitable wireless communication protocol, e.g. Bluetooth low energy (BLE), Bluetooth, radio-frequency identification (RFID), etc.

The power source 13 can be any suitable power source 13. In one embodiment, the power source 13 is a self-contained power source, such as a battery (disposable or rechargeable).

The magnetically controllable switch 12 is a switch whose state can be controlled by a magnet. For instance, the magnetically controllable switch 12 can be a reed switch. The magnetically controllable switch is closed (i.e. assumes a conducting state) when a magnet is provided in its vicinity such that a sufficiently strong magnet field closes the magnetically controllable switch 12. When the magnet is removed, the magnetically controllable switch 12 opens (assumes a blocking state). In other words, the magnetically controllable switch 12 is biased to an open state. Hence, the magnetically controllable switch 12 is open unless a magnet is provided in its proximity providing a sufficiently strong magnetic field to close the magnetically controllable switch 12.

In this way, the magnetically controllable switch 12 is closable by the permanent magnet 22 of the key device 2 when the key device 2 is sufficiently close to the lock device 1 to thereby provide a sufficiently strong magnetic field. When the magnetically controllable switch 12 is closed, the power source 13 powers the electronic lock module 11. The lock device 1 can in this way be configured such that the electronic lock module 11 is only powered when the magnetically controllable switch 12 is closed. The closure of the magnetically controllable switch 12 can function as a wake-up trigger for the electronic lock module 11.

When the magnetically controllable switch 12 is closed, the electronic lock module 11 can communicate with the electronic key module 21 for access control, i.e. to evaluate whether access should be granted or not for this particular key device 2. When access is granted, the lock device 1 is set in an unlocked state.

After the key device 2 is removed for the user to enter the restricted physical space or to go elsewhere, the magnetically controllable switch opens, and no power is consumed until the next time a key device with a magnet is provided by the magnetically controllable switch 12. Optionally, the lock device 1 enters a deep, ultra-low power sleep after a timeout when the key device 2 is removed.

Hence, no polling or pinging is performed by the lock device in the majority of time when no key device is in the vicinity. This saves a significant amount of power. Furthermore, by providing the magnet in the key device 2 and the magnetically controllable switch in the lock device 1, the process is very convenient for the user, by only holding the key device 2 up to the lock device 1. In many cases, the user may anyway be used to presenting the key to the lock for access control. The presented embodiments thus implement a human triggered duty cycle.

In one embodiment, the lock device 1 comprises a magnetic-metal plate 14. For instance, the magnetic-metal plate 14 can contain iron, steel, cobalt, nickel, etc. The magnetic-metal plate is provided in a position to direct the key device 2 to a position in a z-direction where communication between the electronic key module 21 and the electronic lock module 11 is good. Specifically, the magnetic-metal plate 14 can assist in keeping the key device 2 close to the lock device 1. This ensures that the distance between the electronic lock module 11 and the electronic key module 21 is small, which reduces power requirements for wireless communication between these modules. Moreover, the attractive physical force between the magnetic-metal plate 14 and the permanent magnet 22 of the key device 2 assists the user in placement of the key device 2 when this is held up to the lock device 1, making the user experience even more natural and convenient.

Figure 3:
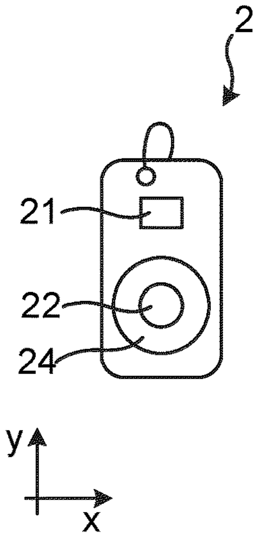
FIG. 3 is a schematic diagram illustrating the key device of FIGS. 1 and 2 according to one embodiment.

FIG. 3 is a schematic diagram illustrating the key device 2 of FIGS. 1 and 2 according to one embodiment. The electronic key module 21 and the permanent magnet 22 can be seen. In one embodiment, the key device 2 comprises only one (single) permanent magnet 22. Furthermore, a key antenna 24 is provided outside (in the x-y plane) of the magnet 22. The key antenna 24 is used by the electronic key module 21 for wireless communication with the lock device 1.

It is to be noted that none of the illustrated components of the key device 2 need to be physically exposed and can e.g. be inside a plastic cover for protection. For instance, the key device 2 can be provided in the form of a key fob.

Figure 4:
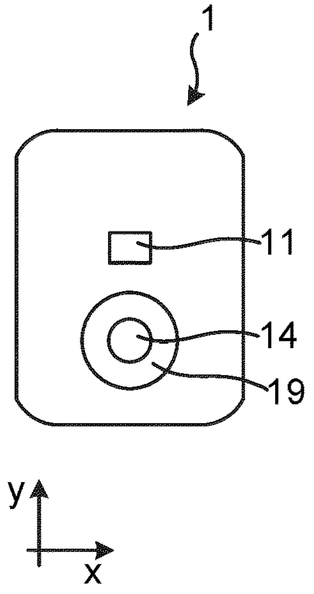
FIG. 4 is a schematic diagram illustrating the lock device of FIGS. 1 and 2 according to one embodiment.

FIG. 4 is a schematic diagram illustrating the lock device 1 of FIGS. 1 and 2 according to one embodiment. The electronic lock module 11 and the magnetic-metal plate 14 are shown. Furthermore, a lock antenna 19 is provided outside (in the x-y plane) of the magnetic-metal plate 14. The lock antenna 19 is used by the electronic lock module 11 for wireless communication with the key device 2.

It is to be noted that none of the illustrated components of the lock device 1 need to be physically exposed and can e.g. be inside a plastic cover for protection.

The embodiments illustrated in FIGS. 3 and 4 provide a very power efficient implementation. The magnetic-metal plate 14 and permanent magnet 22 are attracted to each other. This aligns the magnetic-metal plate 14 and the permanent magnet 22 in the x-y plane, and thus also aligns the key antenna 24 and the lock antenna 19. Since the antennas 24, 19 are aligned in the x-y plane, and are attracted to each other in the z-direction, the wireless communication between the lock device 1 and the key device 2 is consistently extremely power efficient.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising a lock device and a key device for use in access control to a physical space, wherein the key device comprises:

an electronic key module configured to communicate with an electronic lock module of the lock device for access control; and a permanent magnet configured to close a magnetically controllable switch of the lock device to thereby power an electronic lock module of the lock device;

wherein the lock device comprises:

the electronic lock module configured to communicate with the electronic key module to evaluate whether to grant access;

a power source; and the magnetically controllable switch provided between the power source and the electronic lock module such that the magnetically controllable switch is closable by the permanent magnet of the key device to power the electronic lock module;

wherein the lock device further comprises a magnetic-metal plate provided in a position aligning the magnetic-metal plate and the permanent magnet to direct the key device to align a key antenna of the key device with a lock antenna of the lock device.

2. The system according to claim 1, wherein the magnetically controllable switch is open unless a sufficiently strong magnetic field causes the magnetically controllable switch to close.

3. The system according to claim 1, wherein the lock device is configured such that the electronic lock module is only powered when the magnetically controllable switch is closed.

4. The system according to claim 1, wherein the lock device is configured such that the closure of the magnetically controllable switch functions as a wake-up signal for the electronic lock module.

5. The system according to claim 1, wherein the electronic key module and the electronic lock module are configured to communicate using a wireless communication protocol.

6. The system according to claim 1, wherein the magnetically controllable switch is a reed switch.

7. A lock device for use in access control to a physical space, the lock device comprising:

an electronic lock module configured to communicate with an electronic key module of a key device to evaluate whether to grant access;

a power source; and a magnetically controllable switch provided between the power source and the electronic lock module such that the magnetically controllable switch is closable by the permanent magnet of the key device;

wherein the lock device further comprises a magnetic-metal plate provided in a position aligning the magnetic-metal plate and the permanent magnet to direct the key device to align a key antenna of the key device with a lock antenna of the lock device.

8. The lock device according to claim 7, wherein the magnetically controllable switch is open unless a sufficiently strong magnetic field causes the magnetically controllable switch to close.

9. The lock device according to claim 7, wherein the lock device is configured such that the electronic lock module is only powered when the magnetically controllable switch is closed.

10. The lock device according to claim 7, wherein the lock device is configured such that the closure of the magnetically controllable switch functions as a wake-up signal for the electronic lock module.

11. The lock device according to claim 7, wherein the electronic lock module is configured to communicate with the electronic key module using a wireless communication protocol.

12. The lock device according to claim 7, wherein the magnetically controllable switch is a reed switch.

13. A key device for use in access control to a physical space the key device comprising:

- an electronic key module configured to interact with an electronic lock module of a lock device for access control;
- a key antenna; and
- a permanent magnet configured to close a magnetically controllable switch of the lock device to thereby power the lock device, wherein the permanent magnet is configured to be attracted to a magnetic-metal plate of the lock device, to thereby align the key antenna with a lock antenna of the lock device.

14. The key device according to claim 13, wherein the key device comprises only one permanent magnet.

15. The key device according to claim 13, wherein the electronic key module is configured to communicate with the electronic lock module using a wireless communication protocol.

16. The key device according to claim 13, wherein the key device is in the form of a key fob.

* * * * *